United States Patent
Marani et al.

(10) Patent No.: US 12,159,223 B2
(45) Date of Patent: Dec. 3, 2024

(54) PROCESSING DATA OF A NEURAL NETWORK

(71) Applicant: Arm Limited, Cambridge (GB)

(72) Inventors: Davide Marani, Cambridge (GB); Erik Persson, Lund (SE); Viet-Hoa Do, Cambridge (GB); Dan Staffan Henrik Johansson, Malmo (SE)

(73) Assignee: Arm Limited, Cambridge (GB)

( * ) Notice: Subject to any disclaimer, the term of this patent is extended or adjusted under 35 U.S.C. 154(b) by 984 days.

(21) Appl. No.: 17/084,249

(22) Filed: Oct. 29, 2020

(65) Prior Publication Data
US 2022/0138551 A1    May 5, 2022

(51) Int. Cl.
*G06N 3/08*    (2023.01)
*G06F 7/76*    (2006.01)
*G06F 17/16*    (2006.01)
*G06N 3/063*    (2023.01)

(52) U.S. Cl.
CPC ............. *G06N 3/08* (2013.01); *G06F 7/76* (2013.01); *G06F 17/16* (2013.01); *G06N 3/063* (2013.01)

(58) Field of Classification Search
CPC .......... G06N 3/08; G06N 3/063; G06N 3/045; G06F 7/76; G06F 17/16; G06F 17/153
See application file for complete search history.

(56) References Cited

U.S. PATENT DOCUMENTS

2021/0064987 A1* 3/2021 Springer ............... G06N 3/045

FOREIGN PATENT DOCUMENTS

WO    2021045976 A1    3/2021

OTHER PUBLICATIONS

United Kingdom Search report dated Apr. 28, 2022 for United Kingdom Application No. GB 2115518.9.

* cited by examiner

*Primary Examiner* — Xiao En Mo
(74) *Attorney, Agent, or Firm* — EIP US LLP

(57) ABSTRACT

A method of processing image data of a neural network is performed by a data processing apparatus and comprises writing a first tensor to first storage of the data processing apparatus using a row stride, wherein the first tensor comprises at least one data group, the at least one data group comprising a plurality of data samples and having height, width, and depth dimensions [h, w, c]. The method further comprises transforming the first tensor into a second tensor using a first stride such that the second tensor is a column tensor comprising a plurality of rows, and writing the second tensor to second storage using a second stride that is related to a multiple of the first stride, $\delta_n$, such that the second stride covers a first set of memory elements in the second storage into which data samples of a first row of the second tensor are stored and a second set of memory elements into which no data samples from the second tensor are stored.

18 Claims, 9 Drawing Sheets

PROCESSING DATA OF A NEURAL NETWORK

BACKGROUND OF THE INVENTION

Field of the Invention

The present invention relates to a method, an apparatus, and computer software for processing data of a neural network. This disclosure has particular, but not exclusive, relevance for processing multi-dimensional image data within a data processing system used to process a neural network.

Description of the Related Technology

A neural processing unit (hereinafter "NPU") is a specialized processor for processing, and often accelerating, machine learning algorithms and can be a part of a neural processing system. Neural networks contain neural network layers with different types of feature map data. For example, a convolutional layer of a convolutional neural network (CNN) contains an input feature map (IFM) which is convolved with weight data to produce an output feature map (OFM). Neural networks also contain other layer types such as input, output, recurrent neural network, deconvolution, pooling, activation and fully connected. Processing these layers typically involves the transfer of large amounts of data between different storage using multiple memory access operations, including the reading and writing of data to and from the respective storage modules.

An NPU may have a Direct Memory Access engine (hereinafter "DMA") to control access to and fetch data from a storage module (e.g. Dynamic Random-Access Memory, DRAM) in order to perform computations using said data. The data resulting from such computations is often written back into the storage module from which it was originally fetched.

The data that is processed and subsequently stored into memory of a storage module may be "multi-dimensional", that is, representative of multi-dimensional arrays of image data, often referred to as "tensors". As such, it would be advantageous to increase the efficiency of storing multi-dimensional data into memory and accessing multi-dimensional data therefrom.

SUMMARY

According to a first aspect, there is provided a method of processing image data of a neural network, the method being performed by a data processing apparatus. The method comprising writing a first tensor to a first storage of the data processing apparatus using a row stride, wherein the first tensor comprises at least one data group, the at least one data group comprising a plurality of data samples and having height, width, and depth dimensions [h, w, c]; transforming the first tensor into a second tensor by re-writing the first tensor to the first storage using a first stride such that the second tensor is a column tensor comprising a plurality of rows; and writing the second tensor to a second storage using a second stride that is related to a multiple of the first stride, $\delta_n$, such that the second stride covers: a first set of memory elements in the second storage into which data samples of a first row of the second tensor are stored; and a second set of memory elements into which no data samples from the second tensor are stored.

According to a second aspect, there is provided a data processing apparatus comprising a processing element, a first storage and a computer readable medium, the computer readable medium comprising instructions that, when executed by the processing element, cause the data processing apparatus to perform a method of processing image data of a neural network, the method comprising: writing a first tensor to the first storage of the data processing apparatus using a row stride, wherein the first tensor comprises at least one data group, the at least one data group comprising a plurality of data samples and having height, width, and depth dimensions [h, w, c]; transforming the first tensor into a second tensor using a first stride such that the second tensor is a column tensor comprising a plurality of rows; and writing the second tensor to a second storage in communication with the data processing apparatus using a second stride that is related to a multiple of the first stride, $\delta_n$, such that the second stride covers: a first set of memory elements in the second storage into which data samples of a first row of the second tensor are stored; and a second set of memory elements into which no data samples from the second tensor are stored.

According to a third aspect, there is provided a first storage circuitry; and second storage circuitry, wherein the first storage circuitry and the second storage circuitry are arranged to store image data of a neural network, and wherein the processing circuitry is arranged to: write a first tensor to the first storage circuitry using a row stride, wherein the first tensor comprises at least one data group, the at least one data group comprising a plurality of data samples and having height, width, and depth dimensions [h, w, c]; transform the first tensor into a second tensor using a first stride such that the second tensor is a column tensor comprising a plurality of rows; and write the second tensor to the second storage circuitry using a second stride that is equal to a multiple of the first stride, $\delta_n$, such that the second stride covers: a first set of memory elements in the second storage circuitry into which data samples of a first row of the second tensor are stored; and a second set of memory elements into which no data samples from the second tensor are stored.

According to a fourth aspect, there is provided a computer readable medium comprising instructions that, when executed by a processing element of a data processing apparatus, cause the data processing apparatus to perform a method of processing image data of a neural network, the method comprising: writing a first tensor to a first storage of the data processing apparatus using a row stride, wherein the first tensor comprises at least one data group, the at least one data group comprising a plurality of data samples and having height, width, and depth dimensions [h, w, c]; transforming the first tensor into a second tensor using a first stride such that the second tensor is a column tensor comprising a plurality of rows; and writing the second tensor to a second storage in communication with the data processing apparatus using a second stride that is related to a multiple of the first stride, $\delta_n$, such that the second stride covers: a first set of memory elements in the second storage into which data samples of a first row of the second tensor are stored; and a second set of memory elements into which no data samples from the second tensor are stored.

BRIEF DESCRIPTION OF THE DRAWINGS

Further features and advantages of embodiments will become apparent from the following description, given by way of example only, which is made with reference to the accompanying drawings.

FIG. 6A illustrates a schematic representation of an iterative data processing method in accordance with an example of the present disclosure;

FIG. 6B illustrates a schematic representation of an iterative data processing method in accordance with an example of the present disclosure;

FIG. 6C illustrates a schematic representation of an iterative data processing method in accordance with an example of the present disclosure;

DETAILED DESCRIPTION OF CERTAIN INVENTIVE EMBODIMENTS

Figure 1:
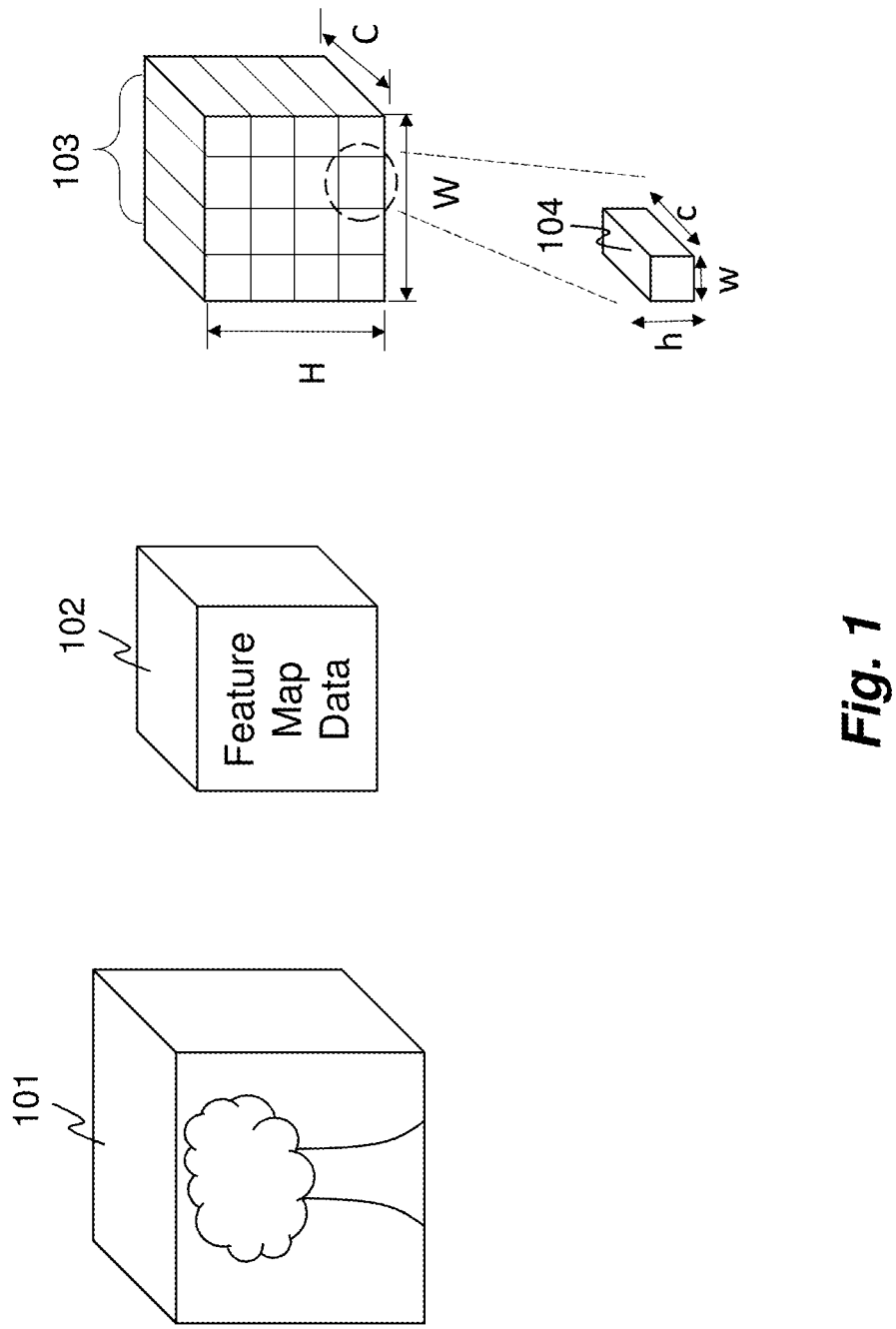
FIG. 1 illustrates different representations of image data associated with a data processing system processing a neural network in accordance with an example of the present disclosure.

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples. Herein, a computer-readable instruction, also referred to as an instruction, is a computer-readable instruction for one or more operations of processing circuitry.

A neural network, such as a convolutional neural network, CNN, comprises one or more layers, each containing a plurality of nodes. In traversing the network, multiple data processing operations and computations are performed within a particular layer to generate output data (for example, in the context of image analysis and/or classification, an output feature map (OFM)) for providing to a subsequent layer, based on: (i) input data (for example, in the context of image analysis and/or classification, an input feature map (IFM)) received from a preceding layer; and (ii) one or more weights associated with the nodes of the particular layer. In some cases, the layers of the CNN may be fully connected layers that generate probabilities rather than IFM and OFM.

One application of a neural network, such as the CNN discussed above, is to classify images, other examples, include image segmentation, speech recognition and depth estimation: mono-depth. For image classification, the weights associated with nodes of a particular layer represent kernels to be convolved with image data, such that weight data may therefore be considered to be kernel data and data input to the neural network, and, more specifically, a layer thereof, is image data representative of at least a portion of an image to be classified by the neural network. The image data can be in any suitable format and may, for example, represent pixel intensity values for respective pixels of an image. The image data may also include data for each of a plurality of color channels, such as the red, green and blue color channels, which is often referred to as "depth" of an image. Accordingly, image data may comprise height, width, and depth data and is thus understood to be "multi-dimensional" and may also be referred to as "spatial" data.

Data processing systems that process neural networks, such as data processing systems comprising a data processing engine, such as a neural processing unit NPU, typically comprise multiple storage modules, such as first storage circuitry and second storage circuitry. The first storage circuitry is used as a data buffer which temporarily stores data to be directly fetched for processing by processing circuitry and/or which temporarily stores data resulting from such processing. In this regard, the first storage circuitry can be understood as a primary memory source with which the processing circuitry has a greater number of interactions than the second storage circuitry (secondary memory source) in order to process data in accordance with layers of a neural network. The second storage circuitry stores data which is to be transferred to and/or from the first storage circuitry and can thus be regarded as a memory source that has mostly indirect interactions with the data processing engine, via the first storage circuitry. Typically, the second circuitry has a larger storage capacity than the first storage circuitry. In examples, the second storage circuitry has the capacity to store all of the input and/or output feature map data relating to a layer of the neural network, while the first storage circuitry has the capacity to store only a portion of a layer's feature map data, at least in the case of some layers of a neural network.

The feature map data stored in the second storage circuitry to be transferred to the first storage circuitry in order to process a layer of the neural network is an input feature map (IFM). In examples, an IFM is stored in the form of feature map data representative of a feature map consisting of elements which have a height, width and depth dimension (as mentioned above, such data is understood to be representative of a multi-dimensional data array, also referred to as a "tensor" or a "tensor block", which is a n-dimensional (multi-dimensional) matrix representing data). For each layer of a CNN, a portion of the IFM can be regarded as an "input tensor" or a "transferred tensor" to be processed by transferring feature map data from the second storage circuitry to the first storage circuitry and then processing the temporarily stored feature map data using neural network processing. The feature map data being transferred from the second storage circuitry is a portion of the data stored by the second storage circuitry and is thus understood to be a subset of that data and thus, a subset of input data for a given layer of the neural network. Tensor data is often stored according to a number, height, width, depth format, also referred to as NHWC format. The number, N, is typically used to index the tensor data in question and is usually 1. The portion of tensor data that is to be transferred from the second storage circuitry is identified using a base address.

The feature map data comprises a plurality of elements which are used to represent corresponding elements of the feature map. In examples, the feature map is derived from an image, where the feature map data comprises tensors that represent pixel values of the image, for example, height, width, and colour (depth) dimensions for each or a number of pixels of the image. The height and width dimensions of the feature map are representative of the x and y coordinates of a pixel in the image. The depth dimension of the feature map is representative of multiple parameter values associated with each pixel, such as intensity values which make up the different color channels. The color channels combine to make up the image depth data, etc. Feature map data representing an entire feature map may be split into portions which are subsets of the feature map data, each representing contiguous elements of a part of the feature map.

In relation to transferring image data between storage circuitry of a neural processing system, such data is often written into and read from memory in a linear manner. The way in which data is stored into memory and the way in which that data is read from memory are factors that affect the arrangement of said data when it is transferred into a different part of memory or a different storage module for processing, which ultimately affects the performance of said processing. Operators associated with nodes within a neural network layer process data to perform operations. The operators read data according to its layout. For tensor data, it is desired to achieve an arrangement of image data that results in data samples associated with different dimensions of the same tensor being grouped when written from one memory to another, such as into temporary memory, for processing by one or more operators in a neural network layer. In order to change how an operator reads data, the layout of data input to said operator can be changed before the operator reads the data. Space to depth transformation is one such way of changing the arrangement of data (without losing any data) prior to the data being read by and processed in a neural network layer, such as a layer containing nodes associated with convolutional operators.

In examples, the grouping of data samples may consist of multiple data samples of a single tensor, or single data group therein, being adjacent to one another within memory. Without such grouping/rearrangement of data, a linear reading of memory locations containing multi-dimensional data provides a linear array of output data (data read from memory) where the output data is often not grouped or arranged by tensor but instead contains adjacent data samples relating to different dimensions of different tensors. In such a scenario, the output data may undergo further processing in order to be arranged per-tensor or per data group, before being processed according to another neural network layer, which is inefficient and computationally expensive, particularly when traversing a neural network comprising multiple layers.

In addition to the efficiency and cost considerations mentioned above, the act of obtaining tensor data from memory of a storage module may be subject to limitations of the hardware being used to obtain said data, for example, limitations of an NPU or a DMA thereof.

A "stride" represents a number of memory locations to advance in order to read/write a next data group after a current data group (in other words, how many memory locations to skip after performing a read/write operation for a current data group before resuming the read/write operation with respect to another data group). Thus, the stride can be used to define how the DMA performs a data access operation, such as a read/write operation and a base address in memory can be used to identify a starting position for said read/write operation. For example, a stride can be used to extract a sub image in a read operation, where the DMA is configured to extract a sub image of a predetermined size (width/height) starting from a predetermined base address in memory. Typically, a DMA writes data from a first ("source") data array to a second ("destination") data array using the full width of the first data array, adds a stride to the destination pointer of the second data array, then writes the next row from the first data array into the second data array, starting at the location of the destination pointer. In the context of tensors, the typical operation of a DMA, as described above, does not support a direct conversion of input tensor data to a desired arrangement of output tensor data because the DMA would read the full width of the input tensor data. This can result in an arrangement of data in an output "destination" data array that may be inefficient for further processing within a neural network, as explained above.

It would be advantageous to improve the efficiency of data access operations for tensor data without increasing the cost of said operations (for example, reducing the number and/or rate of memory accesses, which includes reading from and writing to second storage circuitry during data transfer) and by decreasing the likelihood of requiring further processing to obtain a desired arrangement of data. This could be achieved through an NPU increasing the flexibility of DMA operation, for example, by allowing specification of a size of a data group being accessed and specification of a stride. However, such flexibility can involve the use of complex hardware or rely on complex redesign of hardware that has limitations preventing such flexibility, moreover, sometimes such redesign may not be achievable in existing hardware.

The inventors of the subject application have devised a method of data processing, and a corresponding data processing apparatus and system, described herein that are configured to process tensor data such that it can be retrieved from memory in an efficient manner and within the confines of existing hardware design that may be subject to limitations, without relying on complex redesign of the existing hardware or new hardware.

Accordingly the method comprises writing a first tensor to first storage of the data processing apparatus using a row stride, wherein the first tensor comprises at least one data group, the at least one data group comprising a plurality of data samples and having height, width, and depth dimensions [h, w, c]; transforming the first tensor into a second tensor using a first stride such that the second tensor is a column tensor comprising a plurality of rows; and writing the second tensor to second storage using a second stride that is related to a multiple of the first stride, δn, such that the second stride covers: a first set of memory elements in the second storage into which data samples of a first row of the second tensor are stored; and a second set of memory elements into which no data samples from the second tensor are stored.

Advantageously, the transforming of the first tensor into the second tensor and subsequently writing the second tensor to the second storage using the second stride that is related to a multiple of the first stride, results in the data samples of the at least one data group being dispersed across the memory locations of the second storage, which enables, in future writing operations, further data samples of the at least one data group, and possibly other data groups, to be written to gaps in memory locations that were not written to as a result of the current writing operation. The gaps in memory locations can be made larger by using a larger second stride. A row stride with respect to the first "writing" clause means that the distance, or memory offset being advanced between data samples being written to the first storage is defined in terms of a number of one or more rows, where the number of rows being advanced by the row stride is based on the height dimension of the data group.

In some examples, the height dimension of a data group may be same as the width dimension. The size of the data group is based on its height and width dimensions. In cases where the height and width dimensions are both equal to "n" the size of the data group can be referred to as "n×n". In some examples, where n=2, the row stride is equivalent to two rows, such that the reading and subsequent writing operation with regard to another data source from which the first tensor is retrieved, starts from every other row and the first tensor comprises every other row of the another data source. In such a scenario, n−1 rows are skipped by the row stride.

In other examples, where the height and width dimensions are not equal to one another, the size of the data group can be referred to as "m×n" (where height is represented by m and width is represented by n). In these scenarios, m−1 rows are skipped by the row stride.

As a result of the method described above, a spatial to depth operation has occurred with respect to data of the first tensor such that data relating to a given data group is written to adjacent memory locations in the second storage, despite the use of a row stride, which skips one or more rows, when initially writing the first tensor to the first storage. Accordingly, the herein described space to depth operation operates on [h, w, c] blocks of tensor data (that is, blocks that are subsets of tensor data defined by NHWC format in storage). For examples where height and width dimensions of a data group within a block of tensor data are equal to n, the space to depth operation may transform the data group into a depth-oriented data group having the following dimensions [h/n, w/n, c*$n^2$] by writing the data back to the second storage using the second stride. In particular, where the height and width of a data group that is the subject of the space to depth operation is n, the space to depth operation may operate on [n, n, c] data groups of tensor data and transform them into [1, 1, c*$n^2$] data groups of tensor data. For examples where height and width dimensions of a group of data within a block of tensor data are equal to m and n, respectively, the space to depth operation may transform the data group into a depth-oriented data group having the following dimensions [h/m, w/n, c*m*n] by writing the data back to the second storage using the second stride.

This rearrangement of data increases the efficiency of data processing operations/computations associated with subsequent layers of the neural network that use said data as the basis for those operations/computations. In addition, the spatial-to-depth reshaping and subsequent merging of data in the second storage avoids complex redesign of existing hardware and the replacement of existing hardware with new hardware.

The first stride may be related to the width dimension of a data group in the first tensor. The term "related to" covers the first stride being greater than (for example, a multiple of) or being smaller than (for example, a factor of) the width of the data group n, or being equal to the width dimension, n. In the latter scenario, the first stride, n, enables a reshaping of the spatial data to generate a column tensor, which is efficiently stored within the first storage because there are no "gaps" within memory locations of the first storage that are left empty by using a stride that is greater than the width dimension of the data group. In examples the first storage may have limited space (such as SRAM) so having a first stride equal to the width dimension does not waste space in the SRAM by leaving gaps of blank memory locations.

In relation to the second stride, the term "related to" covers the second stride being greater than (for example, a multiple of), smaller than (for example, a factor of), or equal to the first stride. Advantageously, having a second stride that is greater than the first stride, and perhaps is a multiple of the first stride, results in gaps in memory when the transformed first tensor (that is, the second tensor) is written to the second storage. The gaps can be "filled" with other data that is written to the second storage at a later point in time, and which is possibly related to the same data group as the data written to memory locations adjacent, and possibly preceding, a respective gap. Where the second stride is a multiple of the first stride, this ensures that the gaps in memory that are not written to with data of the first tensor are at least large enough to fit data samples of another tensor that are written to the second storage as part of a subsequent writing operation of the overall data processing method.

The aforementioned method may be performed as a layer of the neural network, whereby the first tensor comprises at least a portion of input feature map data and the second tensor comprises at least a portion of output feature map data to be processed by another layer of the neural network.

In examples, the first storage may comprise SRAM and the second storage may comprise DRAM. Optionally, tensor data stored in DRAM is arranged in NHWC format, whereas tensor data stored in SRAM is arranged according to a different format.

In examples, the transforming of the first tensor into the second tensor comprises writing the first tensor to third storage using the first stride, where the third storage may be of the same type as the first storage, for example SRAM, and may comprise memory space in the same storage module as the first storage. The writing may comprise re-writing the first tensor into the first storage.

In examples, writing the first tensor to the first storage, transforming the first tensor into the second tensor, and writing the second tensor to the second storage may be performed in a first iteration of an iterative process. The iterative process comprises multiple iterations, each of which involves the reshaping and writing of tensor data to the second storage. The multiple iterations of the iterative process can be expressed as i from 0 to n−1. In some examples, a second iteration of the iterative process may be initiated in response to completion of the first iteration, however, the second iteration could also be initiated in response to partial completion of the first iteration such that there is some overlap between the performance of the first and second iterations, speeding up completion of the overall iterative process. This is also applicable to other iterations of the iterative process. The number of iterations in the iterative process may relate to, and in some scenarios be equal to, the height dimension of the at least one data group in the first tensor.

In relation to performing the first iteration, data samples of a second row of the second tensor may be stored into a third set of memory elements in the second storage, offset from the first set of memory elements by the second stride.

Further in relation to performing the first iteration, it may be that no data samples of the second tensor are stored into a fourth set of memory elements, offset from the second set of memory elements by the second stride.

Optionally, the iterative process further comprises a second iteration comprising: writing a third tensor to the first storage from the second storage; transforming the third tensor into a fourth tensor using the first stride, such that the fourth tensor is a column tensor comprising a plurality of rows; and writing the fourth tensor to the second storage using the second stride offset from the first set of memory elements, such that data samples in a first row of the fourth tensor are stored into the second set of memory elements and data samples in a second row of the fourth tensor are stored into the fourth set of memory elements.

As an alternative to the iterative process, the method described herein may be performed using parallel processing, whereby the first tensor is reshaped and written to the second storage in parallel with reshaping and writing of the third tensor to the second storage.

The first tensor and the third tensor may correspond to respective subsets of an input tensor stored in the second storage. Accordingly, the input tensor stored in the second storage may be an input feature map, IFM.

In examples, the method may further comprise receiving the first tensor from the second storage, wherein the first tensor is representative of a portion (subset) of tensor data stored into the second storage.

Neural Processing

FIG. 1 illustrates a diagram of different representations of image data associated with a data processing system processing a neural network in accordance with an example. Image 101 is processed by a convolutional neural network, CNN, to identify features. The image 101 has pixel values which can be represented in height, width and depth dimensions of a feature map, represented by feature map data 102. The depth dimension of the corresponding feature map represents color channel values which combine to construct the image 101. In examples, the color channels are expressed as RGB (red, blue and green) intensity values but may be color values in a different color model.

The feature map data 102 comprises a plurality of tensors 103 that represent the pixel values of the image 101, in particular, the height, width and depth dimensions (H, W, C) of the pixels. These dimensions are understood to collectively define "spatial" image data of each pixel in a NHWC format in a first storage module. Each individual tensor block 104 of the plurality of tensors 103 represents a portion of the feature map data 102 having dimensions (h, w, c) and comprising one or more data groups. When the tensor data is transferred from the first storage module into another storage memory for processing as part of a neural network layer, the format of the data may not necessarily be NHWC. After processing, the tensor data can be written back to the first storage module in NHWC format.

In the present example, the data sizes of the plurality of tensor blocks 103 are determined by the storage capacity of a corresponding storage module. It should be noted that although the demonstrated plurality of tensor blocks 103 are planar, in other examples, the tensors are taken vertically, from top to bottom. In examples, the represented part of the feature map dimensions and data size of each of the plurality of tensor blocks 103 is identical.

Figure 2:
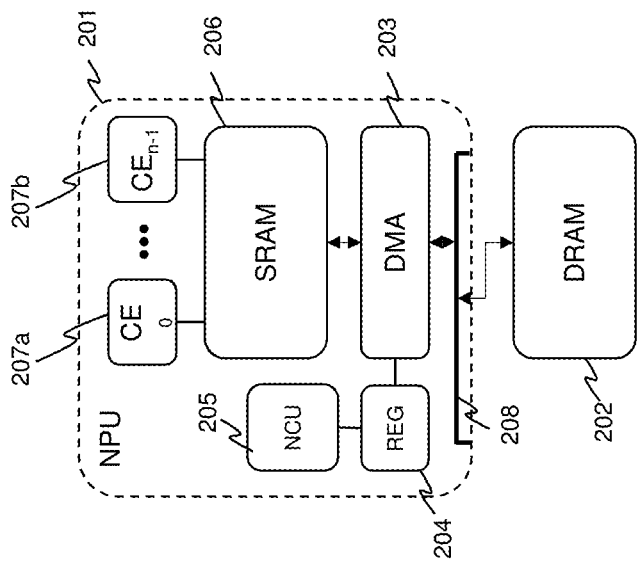
FIG. 2 illustrates a schematic block diagram representing a data processing system comprising an NPU and storage circuitry in accordance with an example of the present disclosure.

FIG. 2 illustrates a schematic block diagram representing a data processing system comprising an NPU and storage circuitry in accordance with an example of the present disclosure.

The NPU 201 comprises a first storage module 206, in this case, the first storage module comprises temporary memory SRAM, and a processing element 203, which in this case is a direct memory access engine, DMA. The DMA 203 is coupled to the SRAM 206 via a main data channel. The DMA 203 is also coupled via a data transfer interface, such as system bus 208, to a second storage module 202, in this case, the second storage module comprises DRAM. The NPU 201 also comprises a neural control unit (NCU) 205 coupled to a register 204 of the DMA 203.

The SRAM 206 is understood to be a storage module that has direct interactions with the DMA 203 and compute engines 207a, 207b. The SRAM 206 is coupled to the compute engines 207a, 207b. The SRAM 206 is used to store feature map data in the form of IFM data to be processed and OFM data after processing, and other data associated with processing such as weight data, activation functions and pooling operations.

The DRAM 202 is understood to be a storage module that has indirect interactions with the DMA 203 via the interface 208. The DRAM 202 is used to store feature map data, for example, tensors, and other data associated with the neural network such as weight data and instructions. The feature map data may be IFMs, OFMs, or tensors of IFMs and OFMs and sections of compressed feature map data.

The DMA 203 facilitates the exchange of data between the DRAM 202 and the SRAM 206. For example, reading data from the DRAM 202 and writing the data to the SRAM 206 to be temporarily stored for processing and, after the processing, writing processed data back to the DRAM 202.

In the context of neural processing, the transferring of data from the DRAM 202 to the SRAM 206, and vice versa, enables computations of different layers within a convolutional neural network to be performed by the NPU 201. For a convolutional layer, data written to the SRAM 206 is processed by convolving, for example, input feature map data 102 (FIG. 1), with weight data to produce an output feature map data 102. In other examples, processing the IFM includes operating the IFM with activation functions, pooling and deconvolution.

The compute engines 207a, 207b comprise multiply accumulate (MAC) compute engines (MCE) and programmable layer engines (PLE). MCEs are configured to perform the aforementioned convolutions between an IFM and weight data to generate an OFM. These convolutions may be broken down into IFM tensors and convolved with weight data to generate OFM tensors as discussed previously. PLEs are arranged to perform additional processing operations of the IFM, OFM, IFM tensor data or OFM tensor data including pool operations and applying activation functions. The PLE can also be programmed to perform a number of operations on different layers of the CNN, allowing for a broad range of CNN architectures to be implemented. In examples, the data processing system is configured for parallel processing. The SRAM 206 is configured to transfer feature map data for processing from a plurality of data buffers equal to the number of compute engines 207a, 207b, with the DMA 203 configured to transfer the data to the plurality of data buffers.

The register 204 of the DMA 203 can be set by the NCU 205. The register 204 comprises a memory address register, byte count register and one or more control registers which are used to specify the source, destination, direction and the amount of the data transfer. The NCU generates control data for the hardware components of the NPU 201, such as the DMA 203 and compute engines 207a, 207b. In examples, other types of processing circuitry are used in place of the NCU, such as a central processing unit, CPU, or a graphical processing unit, GPU.

In examples, the neural network is processed by the data processing system by executing a set of instructions where an instruction implements a layer of the neural network. The set of instructions has a sequence that is used to determine the sequence of neural network layers in the neural network. Earlier layers of neural networks have feature may data which represents a part of the feature map that is shallow, wide and deep and later layers of neural networks have feature may data which represents a part of the feature map which is shallow and thin but deeper than the dimensions of feature maps of earlier layers.

Data Processing

As mentioned above, processing data retrieved from a memory source, such as the DRAM 202, in a particular way can result in a desired arrangement for the data in said memory, which improves the efficiency of subsequent memory access operations and, as a result, increases the efficiency and performance of a neural network layer that manipulates and processes data stored into the memory source.

Figure 3:
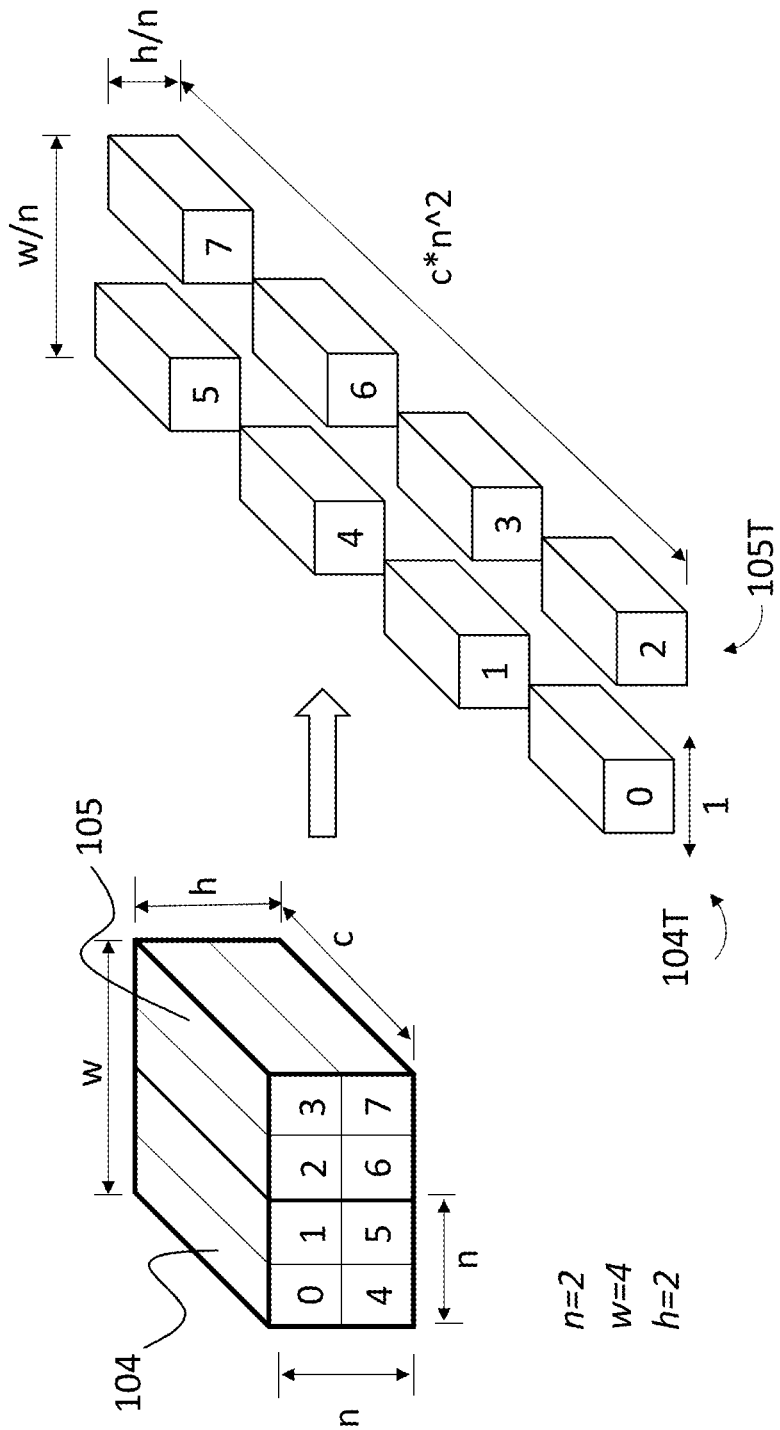
FIG. 3 illustrates a schematic representation of processing data in accordance with an example of the present disclosure.

FIG. 3 illustrates a schematic representation of pre-processed and processed data in accordance with an example of the present disclosure.

A first tensor block 104 comprises a single data group comprising data samples [0, 1, 4, 5] and a second tensor block 105 comprises another single data group comprising data samples [2, 3, 6, 7]. In addition, the width (w/2) and height (h) of both tensor blocks 104, 105, and the single data groups therein, is n, which for this example is equal to 2. The depth dimension of both tensor blocks 104, 105, and the single data groups therein, is c.

The first and second tensor blocks 104, 105 are understood to comprise "pre-processed" data that is retrieved from a storage module, such as DRAM 202 (FIG. 2), and written to another storage module, such as SRAM 206 (FIG. 2), for processing as part of execution of a layer of a neural network. Accordingly, the first and second tensor blocks 104, 105 are collectively representative of a portion of an input feature map, IFM, having a height of 2, width of 4 and depth of c, which can be expressed as: [2, 4, c] and comprising data groups of size n×n (n multiplied by n). In other examples, the pre-processed data may be retrieved from one part of a storage module and written to another part of the same storage module for processing.

As a result of being processed, the first tensor block 104 has been transformed into tensor block 104T and the second tensor block 105 has been transformed into tensor block 105T and, in some examples, tensor blocks 104T and 105T are written to a memory space in the storage module from which they were originally retrieved. The transformation of both blocks 104, 105 has resulted in a rearrangement of the data group and thus data samples of each block, such that the height, width and depth dimensions of the respective blocks have changed, whilst the NHWC format and number of data samples in each block is maintained. The tensor block 104T comprises data samples [0, 1, 4, 5] and has number, height, width and depth dimensions that are different to the corresponding dimensions of the first tensor block 104. The tensor block 105T comprises data samples [2, 3, 6, 7] and has number, height, width and depth dimensions that are different to the corresponding dimension of the second tensor block 105.

The changes in dimensions between the pre-processed tensor blocks 104, 105 and the processed tensor blocks 104T, 105T are a result of a transformation that has decreased the width and height dimensions and increased the depth dimension, which is understood to be a "space to depth" transformation. The particulars factors by which the dimensions change (increase/decrease) can vary for different space to depth transformations. In the example of FIG. 3, the space to depth operation operates on [n, n, c] data groups of an IFM (in blocks 104 and 105) and transforms them into [h/n, w/n, c*n²] data groups (in blocks 104T and 105T).

The height dimension of tensor block 104T is half the height, h/2, of the height dimension, h, of the first tensor block 104 (h/n=h/2 because n=2). The width dimension of the tensor block 104T is half the width, w/2, of the width dimension, w, of the first tensor block 104 (w/n=w/2 because n=2). The depth dimension, $c*n^2$, of tensor block 104T is $n^2$ times larger than the depth dimension, c, of the first tensor block 104. The factor $n^2$ ensures that all the spatially arranged data samples of the first tensor block 104 are represented in the new depth-oriented arrangement of the date group in block 104T. Accordingly, the data group in block 104T has height, width, depth dimensions of [1, 1, 4c].

The same changes in dimensions have occurred in relation to the data group of the tensor block 105T with respect to the data group of the second tensor block 105. The tensor blocks 104T, 105T are collectively representative of an output feature map, OFM, having a height of 1, width of 2 and depth of 4c, which can be expressed as: [1, 2, 4c].

After generation of the tensor blocks 104T and 105T, they are written back to the storage module from which they were originally retrieved. In other examples, the data groups of blocks 104T and 105T may be written to a different storage block from where they were originally retrieved, possibly for further processing.

Figure 4:
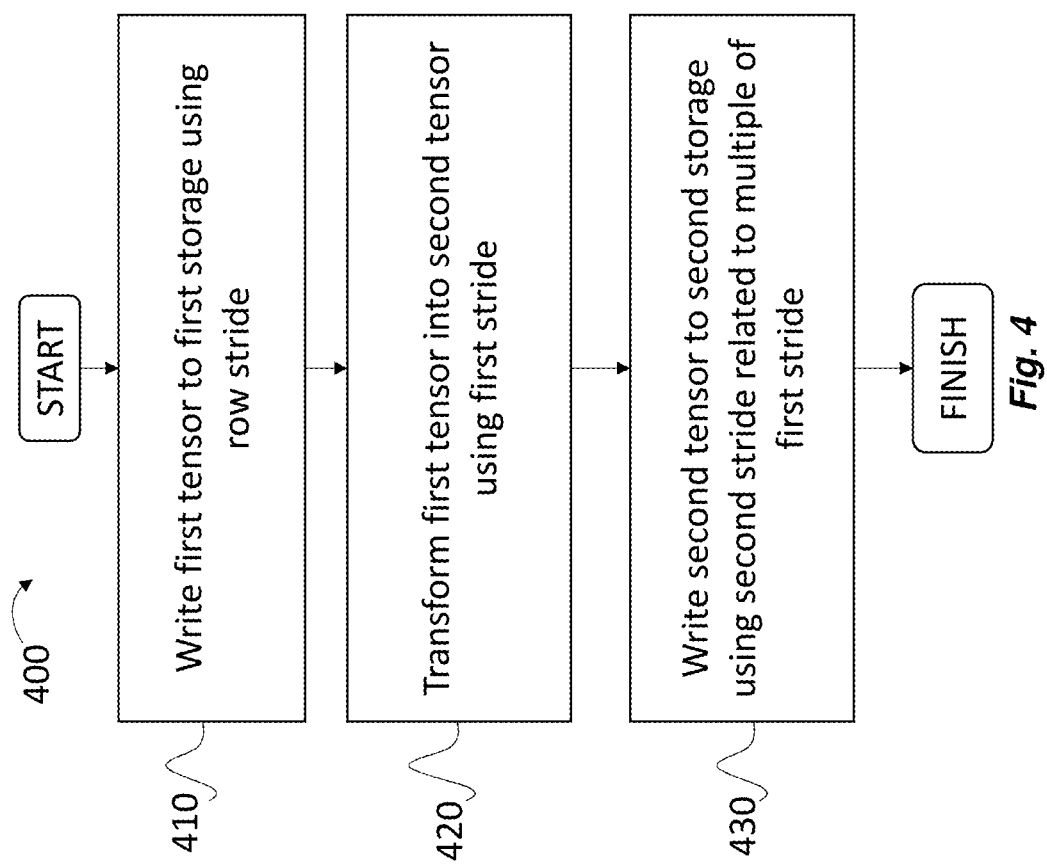
FIG. 4 is a flowchart of a method of processing data in accordance with an example of the present disclosure.

FIG. 4 is a flowchart of a method 400 of processing tensor data of a neural network in accordance with an example of the present disclosure. The method 400 may be implemented to achieve the space to depth transformation of the tensor blocks described in relation to FIG. 3. Method 400 may be executed at least in part by a DMA as a layer in the neural network and thus can be referred to as a "space-to-depth" layer of the neural network.

At 410, a first tensor is written to a first storage module of a data processing apparatus using a row stride. The first tensor comprises at least one data group, the at least one data group comprising a plurality of data samples and having height, width, and a depth dimension, [h, w, c].

At 420, the first tensor is transformed into a second tensor using a first stride such that the second tensor is a column tensor comprising a plurality of rows.

At 430, the second tensor is written to a second storage module using a second stride, $\delta_n$, that is related to a multiple of the first stride, such that the second stride covers: a first set of memory elements in the second storage module into which data samples of a first row of the second tensor are stored; and a second set of memory elements into which no data samples from the second tensor are stored.

Figure 5:
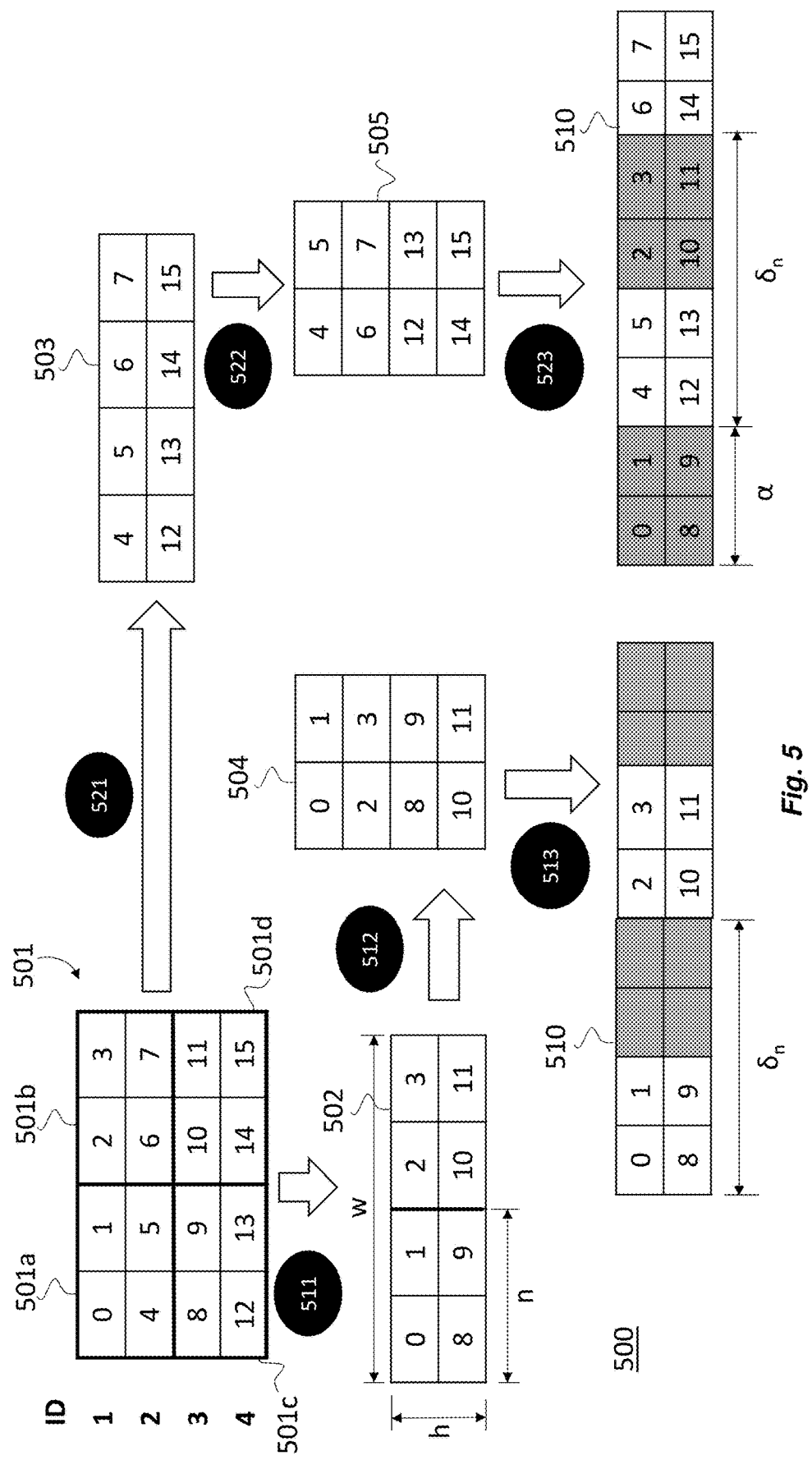
FIG. 5 illustrates a schematic representation of an iterative data processing method in accordance with an example of the present disclosure.

FIG. 5 illustrates a schematic representation of a method 500 of performing an iterative data process in accordance with an example of the present disclosure. Each iteration of method 500 corresponds to the method 400 described in relation to FIG. 4.

An input tensor 501 is stored into a storage module communicatively coupled to an NPU, such as DRAM. The input tensor 501 defines spatial data having width, height, and depth dimensions. The input tensor 501 is stored according to the NHWC format and has the following properties [1, 4, 4, 1]. The depth dimension, c, for the input tensor 501 is 1 and is not shown in FIG. 5 for clarity. The input tensor 501 contains a plurality of data groups 501a, 501b, 501c, and 501d that are to be processed as part of processing a neural network. The data groups are a portion of an IFM. The data group 501a contains data samples [0, 1, 4, 5], the data group 501b contains data samples [2, 3, 6, 7], the data group 501c contains data samples [8, 9, 12, 13] and the data group 501d contains data samples [10, 11, 14, 15]. Each data group is of a size equal to height×width. In this example, the height dimension of each data group is the same as the width dimension n, so the data groups are understood to be of size n×n. The width dimension is 2 and so n is understood to equal 2.

The processing of data samples [0-15] is performed in an iterative manner, where the number of iterations is defined by the width of each data group, n. For FIG. 5, n=2 so a first subset of data samples is processed in a first iteration, followed by the processing of a second subset in a second iteration. The first iteration is described in relation to the emboldened labels 511-513 and the second iteration is described in relation to the emboldened labels 521-523.

In the first iteration, a first subset of data samples of the input tensor is read into temporary memory of a storage module associated with the NPU to form a first transferred tensor 502, see step 511. A stride of the reading operation directs where a source pointer begins to read successive data samples (in other words, how far the pointer is advanced between data reads) and thus which data samples are included in the first subset. In the current example, the reading operation is performed using a row stride, which means the distance, or memory offset, between the data samples being read as part of the first subset is related to one or more rows of a given data group in the input tensor 510, based on the height dimension of the data group, which in this example is n=2. This means every other row of the input tensor 501 is read and then written into the transferred tensor 502. Since there are four data samples per row of the input tensor 501, the row stride advances over c*width*n memory locations (1*4*2=8 memory locations) before reading further data samples into the tensor 502.

Accordingly, for the first subset a first row (ID=1) of the input tensor 501 that contains data samples [0, 1, 2, 3] is read into the temporary memory. After reading of the first row, the row stride effectively skips over the next row [4, 5, 6, 7] (ID=2) such that a source pointer is moved to the third row (ID=3). The reading operation resumes with reading the third row into the temporary memory, whereby the data samples [8, 9, 10, 11] of the third row are part of the first subset and in a row of the tensor 502 that is adjacent to the row containing the data samples [0, 1, 2, 3]. Due to the use of the row stride in writing data to the temporary memory, the first subset contains data samples from all data groups 501a-501d. The data samples [0, 1, 2, 3] and [8, 9, 10, 11] are written to the temporary memory in a contiguous manner such that there are no spaces between rows of the transferred tensor 502, despite there being a row between these samples in the input tensor 501. After reading of the third row is completed, the row stride skips over the next row, the fourth row (ID=4).

Next, the transferred tensor 502 is re-written to the temporary memory as a transformed tensor 504 using a stride equal to the width of each data group, n, which defines the distance between the data samples being read as part of a single row in the transformed tensor 504, as being n. In other words, after reading n data samples into a given row of the transformed tensor 504, the following n data samples are read into a new row, and so on. In this way, the writing of the transformed tensor 502 reshapes the data samples of the transferred tensor 502 into a column tensor 504 having a plurality of rows. This is the first stage of the two-stage space-to-depth conversion of the tensor 502.

The column tensor 504 is understood to be an intermediary tensor between the transferred tensor 502 and an output tensor 510. Use of the column tensor 504 enables the data therein to be written to the output tensor 510 in a desired arrangement. In particular, since typical operation of a DMA writes a full width of a given input data array (source) to a given destination array, such operation does not support a direct conversion of the transferred tensor 502 to the output tensor 510. This is addressed by use of the column tensor 504 because a full width of a first row of the column tensor consists of the data samples [0, 1] so they can be written to the output tensor 510, in isolation from other data samples. Accordingly, it is understood that whilst in other examples with varying sizes of data groups the width of the column tensor 504 may vary, it is the generation of the column tensor as an intermediary between the transferred tensor 502 and the output tensor 510 that enables the data to be written to the output tensor 510 in an arrangement that results in space to depth transformation per data group, resulting in interleaving of data from different iterations.

In the context of FIG. 5, n is equal to 2, so the first two data samples [0,1] of tensor 502 are written into a first row of the transformed tensor 504, the second two data samples [2, 3], whilst being in the same row as [0,1] within the transferred tensor 502, are written into a different, adjacent row of the transformed tensor 504 using a first stride that is equal to n. Similarly, the data samples [8, 9] are written into a third row of the transformed tensor 504 and the data samples [10, 11] are written into a fourth row of the transformed tensor 504.

At 513, the transformed tensor 504 is written to the output tensor 510 of the storage module using a stride $\delta_n$, that is a multiple of the stride, n, used to write the transformed tensor 504. This is the second stage of the two-stage space-to-depth conversion of the tensor 502. The stride $\delta_n$ defines the distance between two adjacent rows of the transformed tensor 504 when they are written to the output tensor 510. Accordingly, since the stride $\delta_n$ is a multiple of n, it will cover a greater number of memory locations in the storage module than those that are used to store the data samples of a given row of the tensor 504. In this way, the data samples of each row of the tensor 504 will be followed by memory locations in the output tensor 510 into which no data samples are written within the first iteration, sometimes referred to as "blank" memory locations or regions of no memory access (depicted by grey shading within the output tensor 510).

As depicted in the output tensor 510, the data samples [0,1] are followed by two memory locations into which no data samples from the transformed tensor 504 are written, as such the stride $\delta_n$ covers four memory locations of the output tensor 510 and is therefore twice the stride n used to write the transformed tensor 504. This is the same for data samples [2, 3], [8, 9], and [10, 11].

In the second iteration, a second subset of data samples of the input tensor 501 is read into the temporary memory of the storage module associated with the NPU to form a second transferred tensor 503, see step 521. As for step 511, the reading operation is performed using a row stride. The second row (ID=2) of the input tensor containing samples [4, 5, 6, 7] is read into temporary memory. After reading of the second row, the row stride skips over the next row (ID=3) such that the reading operation resumes reading the fourth row (ID=4) into the temporary memory, such that the data samples [12, 13, 14, 15] are part of the second subset. As in the first iteration, due to the use of row stride in writing data to temporary memory, the second subset contains data samples from all data groups 501a-501d.

Next, the transferred tensor 503 is re-written to the temporary memory as a transformed tensor 505 using a stride equal to the width dimension of the data groups 501a-501d, n, see step 522. In other words, after reading n data samples (2 data samples) into a given row of the transformed tensor 503, the following n data samples are read into a new row, and so on. In this way, the writing of the transformed tensor 505 reshapes the data samples of the transferred tensor 503 into a column tensor 505.

As previously established, for FIG. 5 n is equal to 2, so the first two data samples [4, 5] are written into a first row of the transformed tensor 505, the second two data samples [6, 7], whilst being in the same row as [4, 5] within the transferred tensor 503, are written into an adjacent row of the transformed tensor 505. The data samples [12, 13] are written into a third row of the transformed tensor 505 and the data samples [14, 15] are written into a fourth row of the transformed tensor 505.

Like tensor 504, the transformed tensor 505 is a column tensor having a plurality of rows. At 523, the transformed tensor 505 is written to the output tensor 510 using the same stride as in the first iteration, the stride $\delta_n$, which for the second iteration is offset by n data samples, such that the data samples [4, 5] are written into the first blank memory region immediately following the data samples [0, 1] written into the output tensor 510 in the first iteration. The use of an offset a means that the writing of data to the output tensor 510 in the second iteration "fills the gaps" in memory that were left blank in the first iteration. In this way, the data samples of each row of the tensor 505 are written in between memory locations in the output tensor 510 that already contain data samples, into the gaps in memory that were not accessed in the first iteration. Such interleaving of data written as part of different iterations groups the data samples that are part of the same data group, 501a-501d, in a depth-oriented arrangement. In addition, the use of the offset a and the stride $\delta_n$ for the second iteration means that the memory locations that were accessed in the first iteration are not accessed in the second iteration (depicted by grey shading within the output tensor 510).

As a result of the first and second iterations, the data samples [0,1] are linearly adjacent to the data samples [4,5] that are part of the same data group, 501a. In this way, when the output tensor 510 is read linearly in order to retrieve data for further processing, data samples [0, 1, 4, 5] are grouped together and can be processed more efficiently by a layer of a neural network than if they were not grouped together. This also applies to the linear arrangement of data samples [2, 3, 6, 7], [8, 9, 12, 13] and [10, 11, 14, 15].

Whilst the example of FIG. 5 is described in relation to splitting the input tensor 501 into two subsections and reshaping and subsequently scattering those subsections into memory, in other examples an input tensor may be split into another number of subsections. The following dimensions ($\alpha$, w, h, c, $\delta_h$) can be used to define the dimensions of an arbitrary tensor, where $\alpha$ is the base address (or memory offset), w is the width, h is the height, c is the number of channels, and $\delta_h$ is the memory offset between two data samples in two adjacent rows, that is, the stride. As such, for i from 0 to n-1 a corresponding tensor transferred from a first memory (for example, transferred tensor 502, FIG. 5) would be defined as $$\left(\alpha_i + i \times \delta_h, w, \frac{h}{n}, c, n \times \delta_h\right)$$

and a corresponding output tensor written back to the first memory after reshaping (for example, tensor 510 of FIG. 5) would be defined as $$\left(\alpha_o + i \times n \times c, n, \frac{h}{n} \times \frac{w}{n}, c, n^2 \times c\right)$$

where $\delta_n$ is equal to $n^2*c$.

Figure 6A:
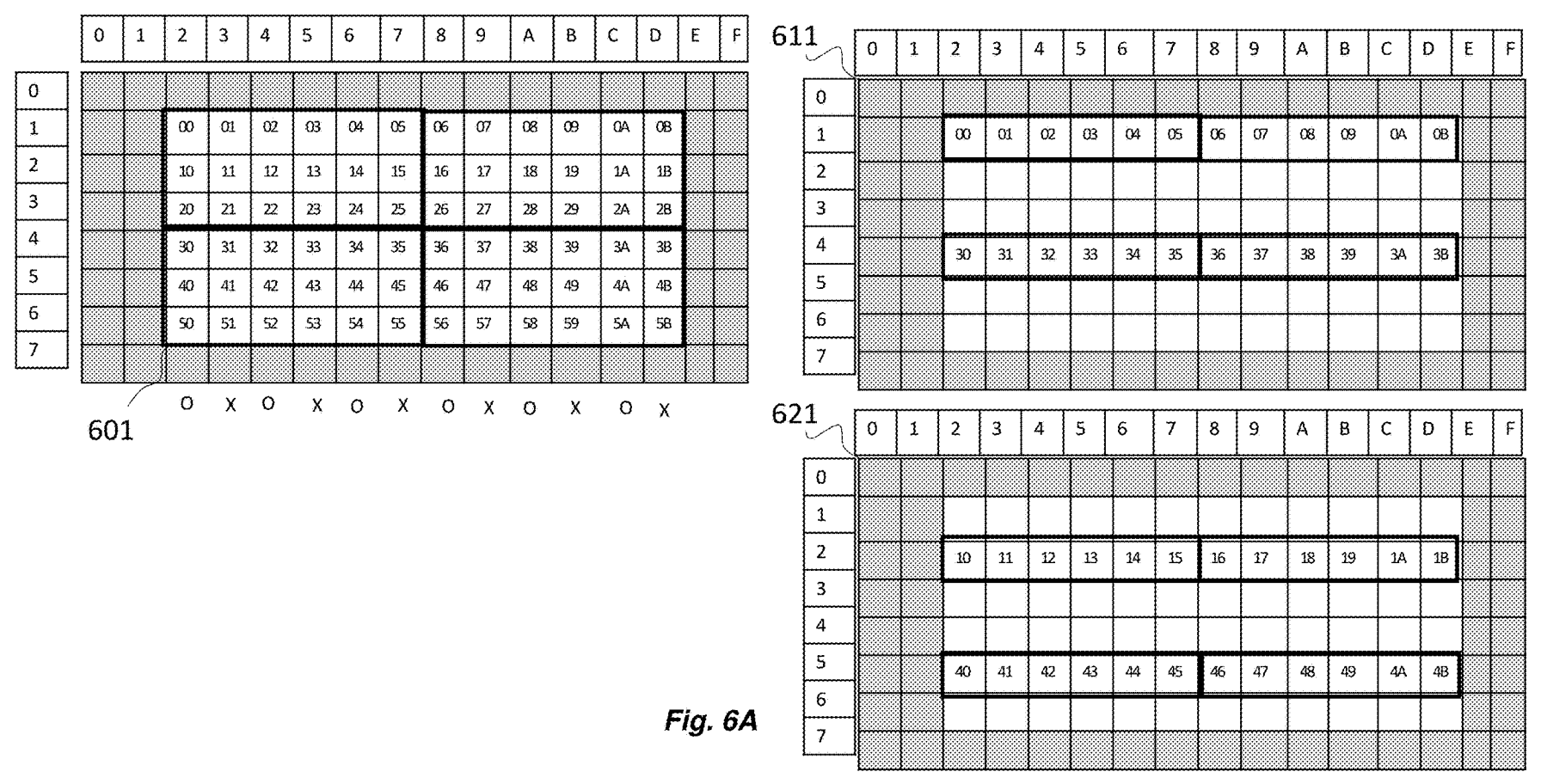

FIG. 6A illustrates a schematic representation of an iterative data processing method in accordance with an example of the present disclosure.

An input tensor 601 has the following dimensions: ($\alpha$, w, h, c, $\delta_h$)=(0x12, 6, 6, 2, 0x10). As for input tensor 501, the input tensor 601 is stored into a storage module, such as DRAM, and is a subset of a larger dataset stored therein. The input tensor 601 undergoes a method of data processing that performs a space-to-depth transformation and involves exchanging tensor data between the storage module into which the input tensor 601 is stored and a second storage module that comprises temporary memory, such as SRAM. The data processing method and rearrangement of tensor data resulting therefrom are described in relation to FIGS. 6A-6D. The input tensor 610 comprises four data groups (each having a width dimension of 6) that can each be further divided into two sub-groups each having width and height dimensions of 3. Accordingly, n=3 for the example of FIG. 6 and the data process with regard to input tensor 601 consists of three iterations. The depth dimension, c, equal to 2 for 601. Accordingly, there are two different channels (depths) for input tensor 601, indicated by the "X" annotations aligned with columns 3, 5, 7, 9, B and D, and the "O" notations aligned with columns 2, 4, 6, 8, A, C.

A tensor 611 depicts the subset of the input tensor 610 that will be processed in a first iteration of the data processing. The tensor 611 has the dimensions:

$$\left(\alpha + 0 \times \delta_h, w, \frac{h}{n}, c, n \times \delta_h\right) = (0 \times 12, 6, 2, 2, 0 \times 30).$$

A tensor 621 depicts the subset of the input tensor 610 that will be processed in a second iteration of the data processing. The tensor 621 has the dimensions:

$$\left(\alpha + 1 \times \delta_h, w, \frac{h}{n}, c, n \times \delta_h\right) = (0 \times 22, 6, 2, 2, 0 \times 30).$$

Figure 6B:
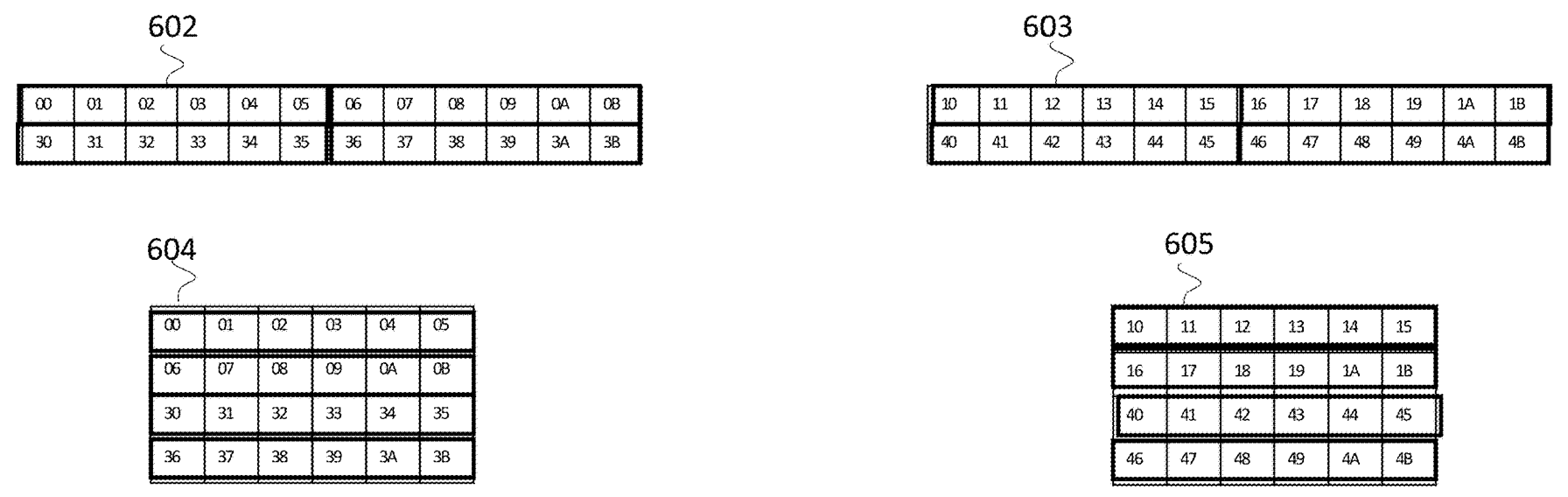

FIG. 6B illustrates a schematic representation of an iterative data processing method in accordance with the example of FIG. 6A.

A tensor 602 depicts the data of tensor 611 of FIG. 6A written into SRAM. The tensor 602 has the following dimensions:

$$\left(\alpha_{t1}, w, \frac{h}{n}, c, w \times c\right) = (\alpha_{t1}, 6, 2, 2, 0 \times 0B).$$

A tensor 604 depicts the data of the tensor 602 converted into a column tensor having the following dimensions:

$$\left(\alpha_{t2}, n, \frac{h}{n} \times \frac{w}{n}, c, n \times c\right) = (\alpha_{t2}, 3, 4, 2, 6).$$

A tensor 603 depicts the data of tensor 621 of FIG. 6A written into SRAM. The tensor 603 has the following dimensions:

$$\left(\alpha_{t1}, w, \frac{h}{n}, c, w \times c\right) = (\alpha_{t1}, 6, 2, 2, 0 \times 0B).$$

A tensor 605 depicts the data of the tensor 603 converted into a column tensor having the following dimensions:

$$\left(\alpha_{t2}, n, \frac{h}{n} \times \frac{w}{n}, c, n \times c\right) = (\alpha_{t2}, 3, 4, 2, 6).$$

Figure 6C:
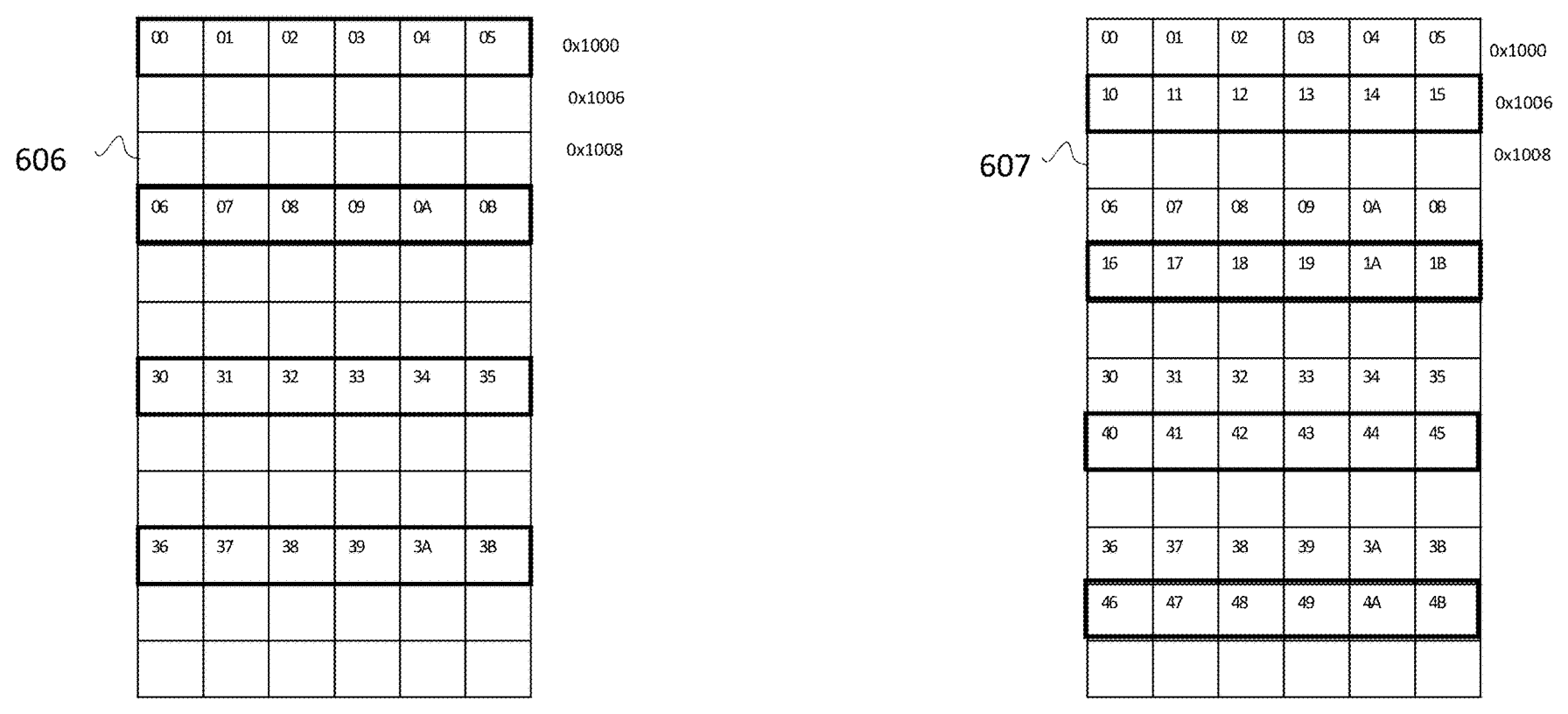

FIG. 6C illustrates a schematic representation of an iterative data processing method in accordance with the example of FIGS. 6A and 6B. A tensor 606 depicts an output tensor written to DRAM after the first iteration of the data processing has been completed. The tensor 606 has the following dimensions:

$$\left(\alpha_0 + 0 \times n \times c, n, \frac{h}{n} \times \frac{w}{n}, c, n^2 \times c\right) = (0 \times 1000, 3, 4, 2, 18).$$

A tensor 607 depicts an output tensor written to DRAM after the second iteration of the data processing has been completed. The tensor 607 has the following dimensions:

$$\left(\alpha_0 + 1 \times n \times c, n, \frac{h}{n} \times \frac{w}{n}, c, n^2 \times c\right) = (0 \times 1006, 3, 4, 2, 18).$$

Figure 6D:
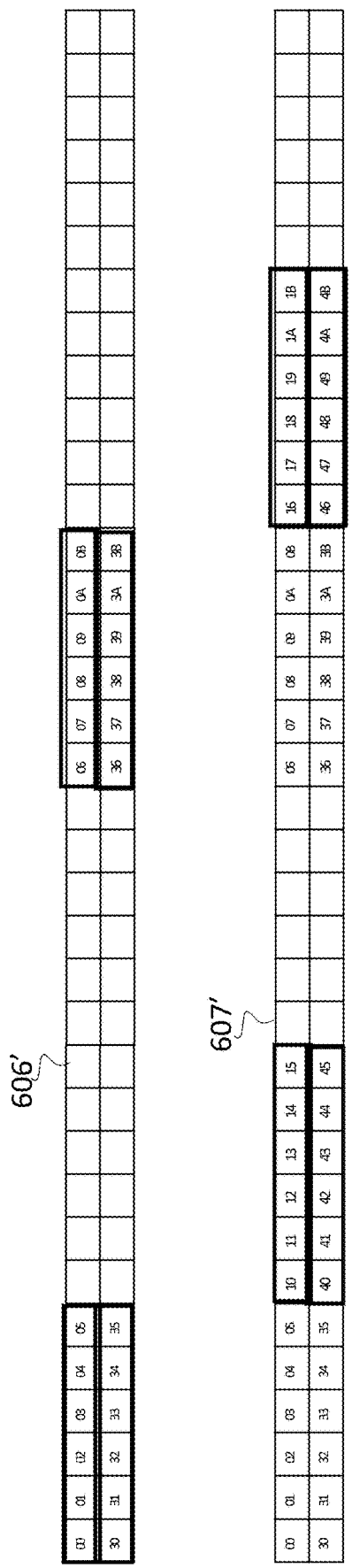
FIG. 6D illustrates a schematic representation of an iterative data processing method in accordance with an example of the present disclosure.

FIG. 6D illustrates a schematic representation of an iterative data processing method in accordance with the example of FIGS. 6A, 6B and 6C. A tensor 606' depicts the tensor 606 of FIG. 6C with a space-to-depth view in DRAM and a tensor 607' depicts the tensor 607 of FIG. 6C with a space-to-depth view in DRAM. Both tensors 606' and 607' have the following dimensions:

$$\left(\alpha_0, \frac{w}{n}, \frac{h}{n}, c \times n^2, w \times n \times c\right) = (0 \times 1000, 2, 2, 18, 36).$$

The method of data processing, and associated data processing system, and data processing apparatus, described in relation to FIGS. 1-6D are particularly useful in implementing a re-arrangement of data stored within a storage module that increases the efficiency of subsequent data access operations to said storage module.

In terms of neural network processing, a neural network that incorporates the data processing method and system, as described above, runs more efficiently using existing hardware, without complex redesign or complete replacement of said hardware.

The above examples are to be understood as illustrative examples. Further examples are envisaged. For example, although in examples above, the data processing system is described as being applicable for use in the classification of image data by a neural network, this is not to be taken as limiting. Indeed, it is to be appreciated that the data processing system may be used for classification or inference of any type of data (such as language data representative of words or sentences, for natural language processing), using any type of machine learning system. Furthermore, the data processing system may be used for other processing which does not involve a machine learning system. For example, the data processing system may be used to process image data using image data methods that involve convolution of kernels with image patches for other purposes than as part of a machine learning system.

It is to be appreciated that although certain components are shown as performing various steps of the methods described herein, in other examples, other components (such as other electronic components or other software and/or hardware) may perform these steps.

The order of processing steps in the examples described above are merely examples. In other examples, these processing steps may be performed in a different order. For example, an image or a feature map derived from image data may be divided into chunks, which may be referred to as tiles. Each tile may be processed separately through a layer of a neural network. Alternatively, an entire image or entire feature map may be processed using a subset of slices of a layer of a neural network (such as a subset of the total number of kernels associated with the layer) to generate partial results that may be added together to generate a final result. Whilst in the above examples, feature maps, and portions of feature maps, are shown in three dimensions, it is to be understood that the invention applies to feature maps which comprise any number of dimensions. Whilst in the above examples, the data processing system is shown as having an NPU, it is to be understood that the invention applies to other processing circuitry such as a CPU or GPU which is used to process neural networks.

Whilst FIGS. 5 and 6B depict data stored in second storage (that is, tensors 502, 504, 602, 603, 604, 605), these depictions are of a chosen "view" of that data and do not necessarily correspond to how that data is arranged in memory of the second storage. For example, data in second storage may be arranged in a way that is optimal for computation engines that process such data.

Whilst in the above examples the first storage and the second storage are understood to be a first storage module and a second storage module that may comprise respective memory space in a given storage module, in alternative examples, the first storage module and the second storage module may comprise memory space in different storage modules.

Whilst in the above examples, the second storage circuitry is shown as being DRAM, it is to be understood that the invention applies to other second storage circuitry types. Whilst in the above examples, the first storage circuitry is shown as being SRAM, it is to be understood that the invention applies to other first storage circuitry types. Whilst in the above examples, the storage circuitry which facilitates the reading and writing of data between the first storage circuitry and second storage circuitry is shown as being a DMA, it is to be understood that the invention applies to other storage circuitry types which can be used to mediate the transfer of data.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure.

What is claimed is:

1. A method of processing image data for a neural network in a data processing apparatus, the method comprising:
   writing a first tensor to first storage of the data processing apparatus using a row stride, wherein the first tensor comprises at least one data group, the at least one data group comprising a plurality of data samples and having height, width, and depth dimensions [h, w, c];
   transforming the first tensor into a second tensor by using a first stride, such that the second tensor is a column tensor comprising a plurality of rows; and
   writing the second tensor to second storage using a second stride that is related to a multiple of the first stride, $\delta_n$, such that the second stride covers:
   a first set of memory elements in the second storage into which data samples of a first row of the second tensor are stored; and
   a second set of memory elements into which no data samples from the second tensor are stored.

2. The method of claim 1, wherein the first stride is related to the width dimension of the at least one data group.

3. The method of claim 2, wherein the first stride is equal to the width dimension of the at least one data group.

4. The method of claim 1, wherein the second stride is equal to a multiple of the first stride.

5. The method of claim 1, wherein the method is performed as a layer of the neural network, whereby the first tensor comprises at least a portion of input feature map data and the second tensor comprises at least a portion of output feature map data to be processed by another layer of the neural network.

6. The method of claim 1, wherein the first storage comprises Static Random-Access Memory, SRAM, and the second storage comprises Dynamic Random-Access Memory, DRAM.

7. The method of claim 1, wherein writing the first tensor to the first storage, transforming the first tensor into the second tensor, and writing the second tensor to the second storage are performed in a first iteration of an iterative process.

8. The method of claim 7, wherein, in the first iteration, data samples of a second row of the second tensor are stored into a third set of memory elements in the second storage, offset from the first set of memory elements by the second stride.

9. The method of claim 8, further wherein no data samples of the second tensor are stored into a fourth set of memory elements, offset from the second set of memory elements by the second stride.

10. The method of claim 9, wherein the iterative process further comprises a second iteration comprising:
    writing a third tensor to the first storage from the second storage;
    transforming the third tensor into a fourth tensor using the first stride, such that the fourth tensor is a column tensor comprising a plurality of rows; and
    writing the fourth tensor to the second storage using the second stride offset from the first set of memory elements, such that data samples in a first row of the fourth tensor are stored into the second set of memory elements and data samples in a second row of the fourth tensor are stored into the fourth set of memory elements.

11. The method of claim 10, wherein the first tensor and the third tensor correspond to respective subsets of an input tensor stored in the second storage.

12. The method of claim 1, further comprising receiving the first tensor from the second storage, wherein the first tensor is representative of a portion of image data stored into the second storage.

13. A data processing apparatus comprising a processing element, first storage and a computer readable medium, the computer readable medium comprising instructions that, when executed by the processing element, cause the data processing apparatus to perform a method of processing image data of a neural network, the method comprising:
    writing a first tensor to the first storage of the data processing apparatus using a row stride, wherein the first tensor comprises at least one data group, the at least one data group comprising a plurality of data samples and having height, width, and depth dimensions [h, w, c];
    transforming the first tensor into a second tensor using a first stride, such that the second tensor is a column tensor comprising a plurality of rows; and
    writing the second tensor to second storage in communication with the data processing apparatus using a second stride that is related to a multiple of the first stride, $\delta_n$, such that the second stride covers:
    a first set of memory elements in the second storage into which data samples of a first row of the second tensor are stored; and
    a second set of memory elements into which no data samples from the second tensor are stored.

14. The data processing apparatus of claim 13, wherein the first stride is related to the width dimension of the at least one data group.

15. The data processing apparatus of claim 13, wherein the second stride is equal to a multiple of the first stride, $\delta_n$.

16. The data processing apparatus of claim 13, wherein the data processing apparatus performs the method as a layer of the neural network, whereby the first tensor comprises at least a portion of input feature map data and the second tensor comprises at least a portion of output feature map data to be processed by another layer of the neural network.

17. The data processing apparatus of claim 13, wherein the first storage comprises Static Random-Access Memory, SRAM, and the second storage comprises Dynamic Random-Access Memory, DRAM.

18. A data processing system comprising:
    processing circuitry;
    first storage circuitry; and
    second storage circuitry,
    wherein the first storage circuitry and the second storage circuitry are arranged to store image data of a neural network, and
    wherein the processing circuitry is arranged to:
        write a first tensor to the first storage circuitry using a row stride, wherein the first tensor comprises at least one data group, the at least one data group comprising a plurality of data samples and having height, width, and depth dimensions [h, w, c];
        transform the first tensor into a second tensor using a first stride, such that the second tensor is a column tensor comprising a plurality of rows; and
        write the second tensor to the second storage circuitry using a second stride that is related to a multiple of the first stride, $\delta_n$, such that the second stride covers:

a first set of memory elements in the second storage circuitry into which data samples of a first row of the second tensor are stored; and a second set of memory elements into which no data samples from the second tensor are stored.

* * * * *